United States Patent
Carlsson et al.

(10) Patent No.: US 6,467,470 B1
(45) Date of Patent: Oct. 22, 2002

(54) METHOD AND SYSTEM FOR REFUELLING COLD-START FUEL TANKS

(75) Inventors: Jan Olof Carlsson, Torslanda (SE); Lars Greger, Angered (SE); Klas Bertil Jansson, Göteborg (SE)

(73) Assignee: AB Volvo, Göteborg (SE)

( * ) Notice: Subject to any disclaimer, the term of this patent is extended or adjusted under 35 U.S.C. 154(b) by 0 days.

(21) Appl. No.: 09/623,020
(22) PCT Filed: Feb. 3, 1999
(86) PCT No.: PCT/SE99/00139
§ 371 (c)(1),
(2), (4) Date: Oct. 5, 2000
(87) PCT Pub. No.: WO99/43938
PCT Pub. Date: Sep. 2, 1999

(30) Foreign Application Priority Data

Feb. 27, 1998 (SE) .............................................. 9800592

(51) Int. Cl.[7] .................................................. F02B 1/00
(52) U.S. Cl. ............. 123/576; 123/179.14; 123/179.15
(58) Field of Search ........................... 123/576, 179.15, 123/179.14; 239/89

(56) References Cited

U.S. PATENT DOCUMENTS 4,520,764 A * 6/1985 Ozawa et al. ................... 123/3
4,646,691 A * 3/1987 Kiyota et al. ............ 123/179 G
4,911,116 A * 3/1990 Prohaska et al. ........ 123/179 G
5,190,001 A * 3/1993 Dieter et al. ............ 123/179.15
5,668,310 A * 9/1997 Parkman et al. ............... 73/113

* cited by examiner

Primary Examiner—Willis R. Wolfe
Assistant Examiner—Rebecca A Smith
(74) Attorney, Agent, or Firm—Burns, Doane, Swecker & Mathis, LLP

(57) ABSTRACT

The present invention relates to a fuel system as well as a method for controlling the same. More specifically, it relates to a fuel system of motor vehicles adapted to be powered by alcohol-containing fuels, and specifically by alcohol-containing fuels and by petrol, so-called Flexible Fuel Vehicles (FFV). These vehicles can be powered by fuels with varying alcohol content, and also by pure petrol. The fuel system according to the invention comprises a main tank (1) for fuel, a cold-start tank (2) with fuel which is sufficiently inflammable to be used in connection with cold starts, as well as fuel line system connecting these tanks to each other and to injection means of the engine of the vehicle, where at least one pump (8, 13) is adapted to transfer fuel through the fuel line system. Specifically, the invention relates to a system which is controlled so that fuel is transferred from the main tank (1) to the cold-start tank (2) when the alcohol content of the fuel is below a predetermined threshold value.

22 Claims, 2 Drawing Sheets

METHOD AND SYSTEM FOR REFUELLING COLD-START FUEL TANKS

FIELD OF THE INVENTION

The present invention relates to a fuel system as well as a method for controlling the same. More specifically, it relates to a fuel system of motor vehicles adapted to be powered by alcohol-containing fuels, comprising a main tank for fuel, a cold-start tank for fuel which is sufficiently inflammable to be used in connection with cold starts, as well as a fuel line system connecting these tanks to each other and to injection means of the engine of the vehicle, at least one pump being adapted to transfer fuel through the fuel line system.

BACKGROUND

Today, many vehicles are adapted to be powered by alcohol-containing fuels as well as by petrol, so-called Flexible Fuel Vehicles (FFV). These vehicles can be powered by fuels with varying alcohol content, as well as by pure petrol. Common alcohol mixtures are, for example, M85, i.e. 85% methanol, and E85, i.e. 85% ethanol, in which, accordingly, the petrol content is about 15%. However, one problem associated with the use of high alcohol-content fuels is that the vehicle is difficult to start, especially when it is cold. If the temperature is below about –10° C., the alcohol does not vaporise at all.

One way of overcoming this problem is to have a separate cold-start tank with petrol, which is used when starting the engine. Subsequently, when the engine has started and is beginning to warm up, the main tank with the alcohol-containing fuel is connected instead. Such a fuel system is described in, for example. U.S. Pat. No. 4,911,116.

However, one problem associated with this known system is that in this connection two tanks must be filled separately. Consequently, the driver must keep track of the level in both tanks in order to be able to fill them in time. Moreover, he must differentiate between two separate filler tubes. In addition to the fact that the driver may find this complicated and troublesome, there is also a risk that the driver will fill the cold-start tank with alcohol-containing fuels by mistake, thus making the vehicle difficult to start.

OBJECT OF THE INVENTION

Consequently, it is an object of the present invention to provide a fuel system as well as a method for controlling the same in which the above-mentioned drawbacks of the prior art are obviated.

An important advantage of the device according to the invention is that all refilling of fuel can be carried out into the main tank, which is easier for the driver. Subsequently, the fuel system automatically transfers fuel from the main tank to the cold-start tank when the conditions are suitable for such a transfer. Furthermore, in this way, fewer filler tubes are required than in prior art devices, contributing to increased safety, particularly with respect to the risk of fire in connection with a side collision. Many other features and advantages are also provided by the invention, as will be apparent from the following description of a preferred embodiment.

BRIEF DESCRIPTION OF THE DRAWINGS

The invention will now be described in more detail by way of example and with reference to the accompanying drawings, in which.

DESCRIPTION OF PREFERRED EMBODIMENTS

Figure 1:
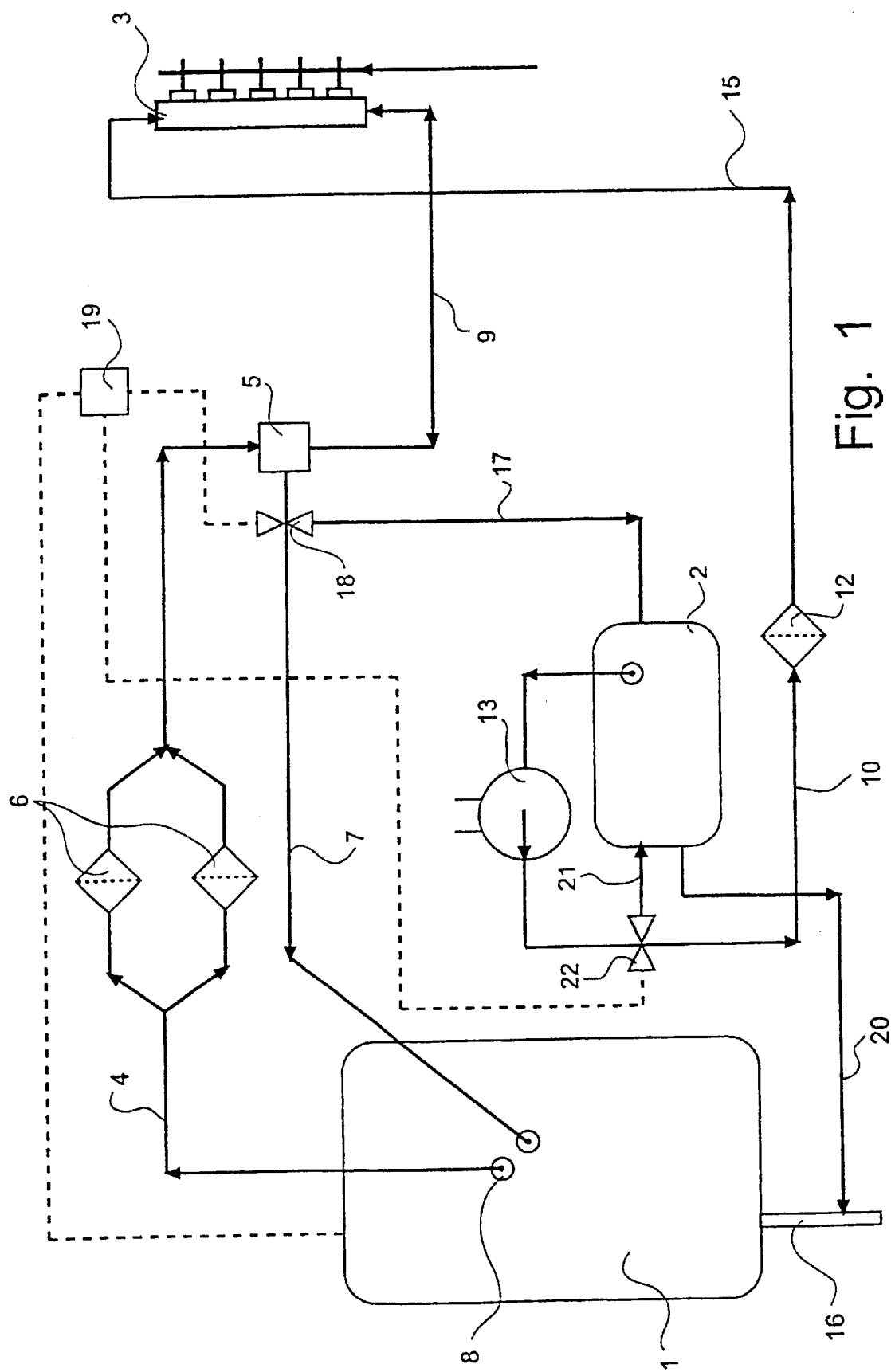
FIG. 1 schematically illustrates a fuel system according to a preferred embodiment of the invention.

A fuel system according to the invention, as schematically shown in FIG. 1, comprises a main tank 1 and a cold-start tank 2, which are connected to each other and to injection means of the engine (not shown) by the intermediary of a fuel line system. The transfer from the fuel line system to the injection means is preferably effected through a so-called fuel rail. Preferably, the cold-start tank is big enough for between 50 and 100 cold starts.

The fuel line system comprises a main supply part and a cold-start supply part.

The main supply part comprises a fuel pipe 4 from the main tank to a pressure regulator 5, by the intermediary of one or several fuel filters 6. The pressure regulator 5 ensures that the pressure on the fuel after the pressure regulator is constant regardless of the fuel flow. Excess fuel is fed back to the main tank by the intermediary of a return line 7. The feeding of fuel from the main tank is effected by way of a feed pump 8.

From the pressure regulator 5, the fuel is subsequently fed to the fuel rail 3 by the intermediary of a pipe 9.

The cold-start supply part comprises a fuel pipe 10 from the cold-start tank 2 to a filter 12. In this connection, the feeding is effected by a cold-start pump 13. A pipe 15 connects the filter 12 to the fuel rail 3.

In normal driving, when the engine is warm, the main supply part is used, fuel being fed from the main tank by the intermediary of the pipe 9 to the fuel rail 3. In connection with a cold start, the cold-start supply part is used instead, fuel being fed by means of the cold start pump 13 and by the intermediary of the pipes 10 and 15. In this connection, the alcohol-containing fuels remaining in the fuel rail are pushed out, and the engine can be started using fuel from the cold-start tank. The return flow from the pressure regulator can be guided to a suitable tank by control means 19 by the intermediary of the adjustable valve 18. After a certain time, which is controlled by a control means, the cold-start pump is shut off and the feed pump in the main supply part is started instead. In this connection, a gradual transfer to fuel from the main tank will take place in the fuel rail 3. The length of the period during which the cold-start supply part should be used depends on, inter alia, the temperature. The temperature also determines whether the cold-start system should be used at all. This is controlled by a control means, which is preferably the control unit of the engine.

The main tank is connected to a filler tube 16, whose mouth is accessible for refilling the tank from the outside. The cold-start tank is also connected to a filler tube 17, but this tube is instead connected by the intermediary of an adjustable valve 18 to the return line 7 of the main supply part.

The adjustable valve 18 is connected to a control means 19, which, for example, can be the control unit of the engine. In this way, the valve is adjustable by way of a relay between a position where fuel which is returned through the return line 7 is guided into the filler tube 17 and ends up in the cold-start tank, and a position where the fuel is returned to the main tank.

The control means 19 controls the valve 18 so that the cold-start tank is filled only when the alcohol content of the fuel is below a predetermined threshold value. For example, information about the quality of the fuel is sent to the control means 19 from the fuel sensing means of the engine (not shown). Preferably, the type of fuel is calculated with the aid of measured values of injected fuel volume, air quantity, and the fuel/air ratio, which can be measured with a linear lambda probe. However, information about the quality of the fuel can, of course, be obtained in other ways. For example, optical or magnetic sensors can be arranged in one of the pipes of the main supply part.

Furthermore, the control means advantageously ensures that the cold-start tank is not filled while the vehicle is being refuelled, i.e. when new fuel is added to the main tank, or shortly thereafter, since the fuel quality may vary in the system at that time. Preferably, this is effected by the control means detecting the level in the main tank as well as detecting whether the vehicle is being driven or is stationary. If the vehicle is stationary at the same time as the level in the main tank increases, this is interpreted as the vehicle being refuelled, whereupon a time counter starts. Until the time counter has reached a certain predetermined value, the control means locks the valve 18 so that refuelling of the cold-start tank cannot take place. Naturally, the determination of the refuelling situation can be carried out solely on the basis of the fuel level in the main tank. However, in that case, there is a risk of error due to splashing in the tank when the vehicle is being driven. Moreover, the control means can, of course, be adapted to automatically prevent filling of the cold-start tank for a certain predetermined period of time or distance covered subsequent to the vehicle having started, regardless of the fuel level.

Furthermore, the control means senses the fuel level in the cold-start tank, refilling of the same being prevented when it does not need to be refilled.

When the control means finds that the conditions are right and that there is a need to refill the cold-start tank, the valve 18 is adjusted so that fuel from the main tank flows into the cold-start tank. Preferably, the control means starts a time counter in connection with the opening of the valve, refilling taking place for a sufficient length of time to fill the cold-start tank.

Furthermore, the cold-start tank is connected to the main tank by way of a return line 20, whereby any overflow in the cold-tank automatically returns to the main tank.

Moreover, filling of the cold-start tank preferably takes place long enough for a certain flow through of the cold-start tank to take place, whereby at least part of the old fuel in the cold-start tank is replaced by new fuel. Advantageously, the time counter can be set so that the cold-start tank is filled with about three times its volume, the excess flowing back to the main tank.

Furthermore, it is disadvantageous for the fuel in the cold-start tank to become too old, since the light fractions of the fuel evaporate as time goes by, making the fuel less inflammable and, consequently, less effective as a starting fuel. Accordingly, it is advantageous for the fuel in the cold-start tank to be changed if it has been in the tank for too long. This is effected by the control means keeping track of how much time has passed since the cold-start tank was last filled. If this time exceeds a certain threshold value, the control means ensures that the fuel in the cold-start tank is flushed through and replaced. Alternatively, such a replacement of the fuel in the cold-start tank can be controlled on the basis of the distance covered since refilling rather than elapsed time.

Further, the control means preferably detects the fuel level in the cold-start tank in order to indicate to the driver by means of a warning means, such as a warning light, that the fuel level in the cold-start tank is below a certain predetermined minimum level, and that it is suitable in connection with the next refuelling to refuel the vehicle with a fuel having properties that are suitable for cold-starts, such as petrol.

Figure 2:
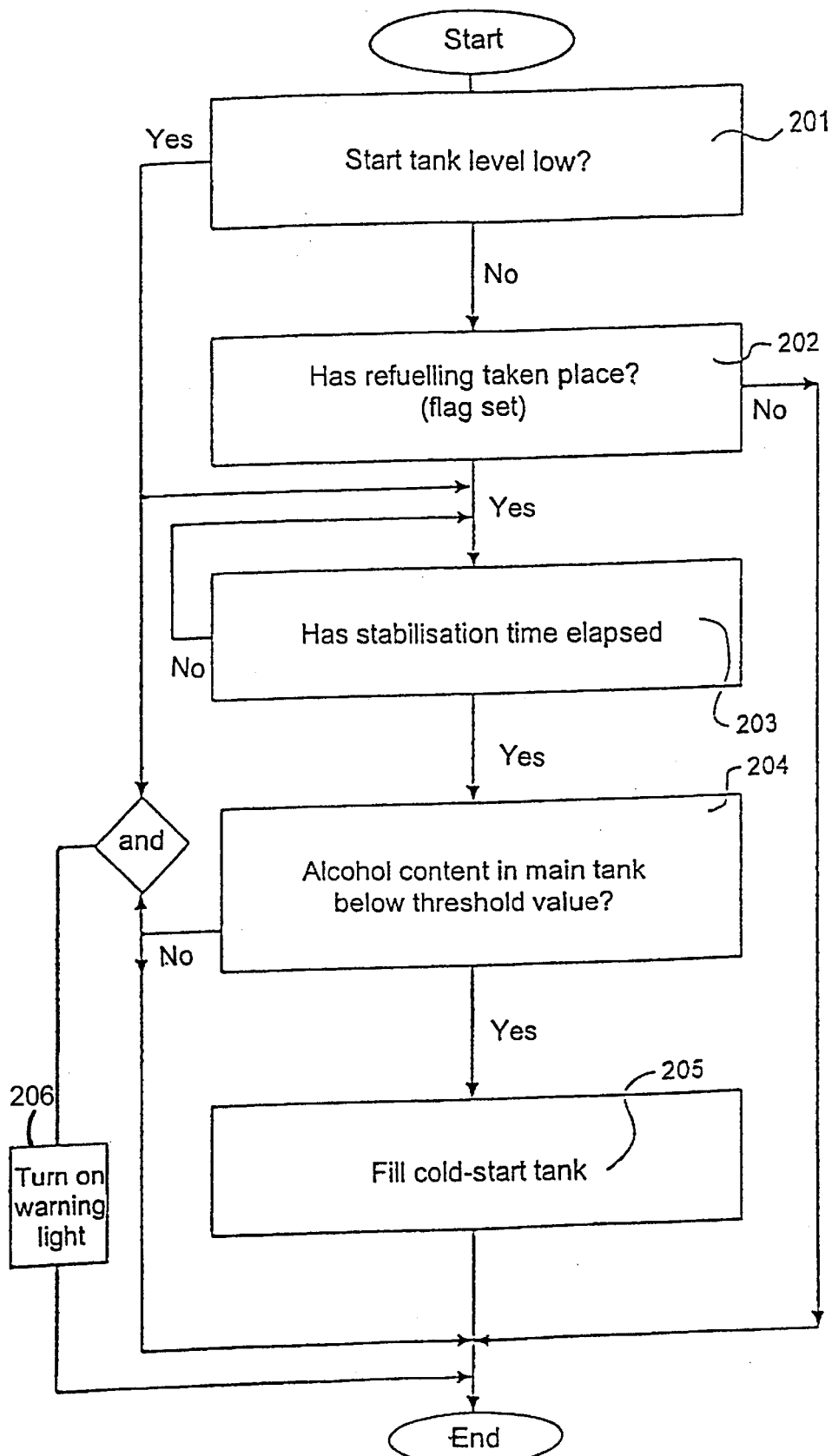
FIG. 2 is a flow chart of the control of the fuel system in FIG. 1.

FIG. 2 schematically shows a flowchart of the control process for the control means 19. A first step 201 verifies whether the level in the start tank is low. If so, the process continues to step 204. If not, i.e. if the level in the start tank is not low, step 202 verifies whether refuelling has taken place, i.e. whether a refuelling flag has been set. If this is not the case, the process ends. However, if refuelling has taken place, the process waits in step 203 until a predetermined stabilisation period has elapsed and then goes on to step 204. Step 204 verifies whether the alcohol level in the main tank is sufficiently low, i.e. whether it is below a certain threshold value. If so, the cold-start tank is filled in step 205, after which the process ends. If, on the other hand, the alcohol level is found to be too high the process stops immediately, without filling the start tank. However, if the level in the start tank is low, in step 201, while at the same time the alcohol level in main tank is too high, in step 204, a warning light also comes on in step 206 to inform the driver. Preferably, this process is repeated continuously when the vehicle is in use.

Moreover, also with reference to FIG. 1, there may advantageously be a return line 21 to the cold-start tank connected to the pipe 10 by the intermediary of a second valve 22. Preferably, this valve is also operated by the control by means of relays and can be opened so that fuel may circulate out from the cold-start tank and back into it again. This is desirable when the cold-start system is not used for relatively long time periods, since otherwise there is a risk that the cold-start pump will get stuck and be damaged. By means of this circulation path, the control means can ensure that the cold-start pump is used with a certain amount of regularity.

The control means which controls valves and pumps in the fuel system is preferably the control unit of the engine.

The above description relates to an exemplary embodiment of the invention. However, several variants of the invention are possible. For example, the composition of the line system can be different, the control means can comprise several separate control units, other control parameters can be used in certain cases, etc. These and other similar variants of the invention shall be considered to fall within the scope of the invention as defined by the appended claims.

What is claimed is:

1. A method for controlling fuel systems of vehicles adapted to be powered by alcohol-containing fuels and by petrol, comprising a main tank for fuel, a cold-start tank for fuel which is sufficiently inflammable to be used in connection with cold starts, and a fuel line system connecting these tanks to each other and to injection means of an engine of the vehicle, at least one pump being adapted to transfer fuel through the fuel line system, wherein the system is controlled so that fuel is transferred from the main tank to the cold start tank when the alcohol content of the fuel is below a predetermined threshold value.

2. A method according to claim 1, wherein the system is controlled so that the transfer to the cold-start tank is prevented when the vehicle is being refuelled, such that new fuel is added to the fuel system.

3. A method according to claim 2, wherein the refuelling is detected when a fuel level of the main tank increases while the vehicle is stationary.

4. A method according to claim 3, wherein an alcohol content of the fuel is determined by fuel-sensing means of the engine.

5. A method according to claim 3, wherein the fuel in the cold-start tank is replaced provided that a certain predetermined time period has elapsed or a certain predetermined distance has been covered since the most recent refilling.

6. A method according to claim 3, wherein a warning means is activated when a fuel level in the cold-start tank is below a certain minimum level.

7. A method according to claim 2, wherein an alcohol content of the fuel is determined by fuel-sensing means of the engine.

8. A method according to claim 2, wherein the fuel in the cold-start tank is replaced provided that a certain predetermined time period has elapsed or a certain predetermined distance has been covered since the most recent refilling.

9. A method according to claim 2, wherein a warning means is activated when a fuel level in the cold-start tank is below a certain minimum level.

10. A method according to claim 2, wherein the system is controlled so that the transfer to the cold-start tank is prevented for a predetermined period of time after the vehicle is refuelled.

11. A method according to claim 1, wherein the alcohol content of the fuel is determined by fuel-sensing means of the engine.

12. A method according to claim 11, wherein the fuel-sensing means of the engine is preferably a linear lambda probe.

13. A method according to claim 1, wherein the fuel in the cold-start tank is replaced provided that at a certain predetermined time period has elapsed or a certain predetermined distance has been covered since the most recent refilling.

14. A method according to claim 1, wherein a warning means is activated when a fuel level in the cold-start tank is below a certain minimum level.

15. A fuel system for vehicles adapted to be powered by alcohol-containing fuels, comprising a main tank for fuel, a cold-start tank for fuel which is sufficiently inflammable to be used in connection with cold starts, and a fuel line system connecting these tanks to each other and to injection means of an engine of the vehicle, at least one pump being adapted to transfer fuel through the fuel line system and control means being adapted to control the fuel transfer, wherein the control means furthermore is adapted to refill the cold-start tank from the main tank provided that an alcohol-content of the fuel is lower than a predetermined threshold value.

16. A fuel system according to claim 15, wherein the control means is connected to level sensors of the main tank and to the control system of the engine, the control means being adapted to prevent transfer to the cold-start tank when the vehicle is being refuelled.

17. A fuel system according to claim 16, wherein the control means is connected to fuel-sensing means of the engine for determining the alcohol content of the fuel.

18. A fuel system according to claim 16, wherein the control means comprises a first time counter, the control means being adapted for refilling the cold-start tank with fuel form the main tank, at least provided that a certain predetermined time has elapsed or a certain predetermined distance has been covered since the most recent refilling.

19. A fuel system according to claim 15, wherein the control means is connected to fuel-sensing means of the engine for determining the alcohol content of the fuel.

20. A fuel system according to claim 19, wherein the fuel-sensing means of the engine comprises a linear lambda probe for determining the alcohol content of the fuel.

21. A fuel system according to claim 15, wherein the control means comprises a first time counter, the control means being adapted for refilling the cold-start tank with fuel from the main tank, at least provided that a certain predetermined time has elapsed or a certain predetermined distance has been covered since the most recent refilling.

22. A fuel system according to claim 15, wherein the control means is also connected to a warning means, the control means being adapted to activate the warning means if a fuel level in the cold-start tank is below a certain minimum level.

* * * * *